US012650305B2

(12) United States Patent (10) Patent No.: US 12,650,305 B2
Pohlmann et al. (45) Date of Patent: Jun. 9, 2026

(54) LASER LEVELING DEVICE AND LEVELING METHOD

(71) Applicant: Robert Bosch GmbH, Stuttgart (DE)

(72) Inventors: Martin Pohlmann, Stuttgart (DE); Wah Pong Calvin Chan, Hong Kong (CN); Axel Rumberg, Karlsruhe (DE); Philip Cheung, Hong Kong (CN); Eddie Kwan, Hong Kong (CN); Chi Fung Chan, Hong Kong (CN)

(73) Assignee: Robert Bosch GmbH, Stuttgart (DE)

( * ) Notice: Subject to any disclaimer, the term of this patent is extended or adjusted under 35 U.S.C. 154(b) by 1016 days.

(21) Appl. No.: 17/757,535

(22) PCT Filed: Nov. 26, 2020

(86) PCT No.: PCT/EP2020/083481
§ 371 (c)(1),
(2) Date: Oct. 12, 2022

(87) PCT Pub. No.: WO2021/121895
PCT Pub. Date: Jun. 24, 2021

(65) Prior Publication Data
US 2023/0045402 A1 Feb. 9, 2023

(30) Foreign Application Priority Data
Dec. 18, 2019 (DE) .................... 10 2019 219 951.8

(51) Int. Cl.
*G01C 15/00* (2006.01)
(52) U.S. Cl.
CPC ......... *G01C 15/004* (2013.01); *G01C 15/008* (2013.01)

(58) Field of Classification Search
CPC ............................ G01C 15/004; G01C 15/008
See application file for complete search history.

(56) References Cited

U.S. PATENT DOCUMENTS 10,386,469 B2 * 8/2019 Mayer ................... G01S 15/931
11,996,892 B1 * 5/2024 Rofougaran ......... H04B 10/503
(Continued)

FOREIGN PATENT DOCUMENTS

CN 101535764 A 9/2009
CN 106353764 A 1/2017
(Continued)

OTHER PUBLICATIONS

International Search Report corresponding to PCT Application No. PCT/EP2020/083481, mailed Feb. 22, 2021 (German and English language document) (6 pages).

*Primary Examiner* — Yaritza Guadalupe-McCall
(74) *Attorney, Agent, or Firm* — Maginot, Moore & Beck LLP

(57) ABSTRACT

A laser leveling device includes at least one laser emitting device for emitting a laser marking, in particular a one-dimensional laser marking, in an emission direction onto a projection surface. The laser emitting device includes a first sensor device for ascertaining the actual alignment of the at least one laser emitting device with respect to the projection surface, a controller which is designed to calculate a target alignment of the at least one laser emitting device at least on the basis of the ascertained actual alignment of the at least one laser emitting device with respect to the projection surface, and a positioning device for aligning the at least one laser emitting device according to the target alignment. The disclosure additionally relates to a leveling method.

16 Claims, 10 Drawing Sheets

(56)     References Cited

U.S. PATENT DOCUMENTS

| | | | | |
|---|---|---|---|---|
| 2013/0229643 A1* | 9/2013 | Moeller | ............... | G01C 15/004 |
| | | | | 356/4.01 |
| 2014/0304994 A1* | 10/2014 | Dumoulin | ............ | G02B 27/648 |
| | | | | 33/290 |
| 2015/0116134 A1* | 4/2015 | Wang | ..................... | G08G 1/141 |
| | | | | 340/932.2 |
| 2017/0116859 A1* | 4/2017 | Mayer | ...................... | G08G 1/04 |
| 2023/0045402 A1* | 2/2023 | Pohlmann | ............ | G01C 15/008 |

FOREIGN PATENT DOCUMENTS

| | | | | | |
|---|---|---|---|---|---|
| CN | 110050172 A | | 7/2019 | | |
| DE | 42 10 824 A1 | | 10/1993 | | |
| DE | 10 2007 039 340 A1 | | 2/2009 | | |
| DE | 10 2007 039 343 A1 | | 2/2009 | | |
| DE | 102007049123 A1 | * | 4/2009 | .......... | G01S 17/875 |
| DE | 10 2009 016 169 A1 | | 10/2010 | | |
| DE | 20 2011 004 651 U1 | | 12/2011 | | |
| DE | 112006004097 B4 | * | 4/2013 | .......... | G01C 15/004 |
| EP | 2458326 A1 | * | 5/2012 | .............. | G01C 3/08 |
| WO | 2009/050057 A1 | | 4/2009 | | |
| WO | WO-2015096060 A1 | * | 7/2015 | .......... | G01C 15/004 |

* cited by examiner 16, 16a 16, 16b d

20

46, 46a 14, 14b

10

22, 22b 14, 14a 46, 46a 22, 22a 16, 16a 46, 46a 16, 16b

20

10

14, 14b 22, 22b 14, 14a 46, 46a 22, 22a

LASER LEVELING DEVICE AND LEVELING METHOD

This application is a 35 U.S.C. § 371 National Stage Application of PCT/EP2020/083481, filed on Nov. 26, 2020, which claims the benefit of priority to Serial No. DE 10 2019 219 951.8, filed on Dec. 18, 2019 in Germany, the disclosures of which are incorporated herein by reference in their entirety.

The disclosure relates to a laser leveling device and to a method for leveling using a laser leveling device according to the disclosure.

BACKGROUND

DE 20 2011 004 651 U1 discloses a leveling apparatus for generating an optical leveling signal, having a housing and a light signal apparatus, arranged so that it is able to swing in the housing, for generating a leveling signal, wherein the housing has an exit opening for the leveling signal.

DE 10 2007 039 343 A1 discloses the general construction of a pendulum laser apparatus. Specific embodiments of pendulum laser apparatuses are known from DE 10 2007 039 340 A1 and from DE 10 2009 016 169 A1 and DE 421 08 24 A1.

SUMMARY

The disclosure proceeds from a laser leveling device comprising at least one laser emission apparatus for emitting an, at least one-dimensional, laser marking, in particular a laser line, in the emission direction onto a projection surface.

It is proposed that the laser leveling device comprises
    a first sensor apparatus for ascertaining an actual alignment of the at least one laser emission apparatus with respect to the projection surface,
    a control apparatus, configured for calculating a desired alignment of the at least one laser emission apparatus on the basis at least of the ascertained actual alignment of the at least one laser emission apparatus with respect to the projection surface, and
    a positioning apparatus for aligning the at least one laser emission apparatus according to the desired alignment.

The laser leveling device serves for producing at least one optical laser marking as part of leveling, alignment, measurement and/or marking tasks, as they occur in particular in areas of skilled trade. For example, laser leveling devices are used in interior construction of buildings, for building works, when applying markings to walls, or the like. The laser marking can be present for example in the form of a one-dimensional laser line. Any desired configurations of the at least one-dimensional laser line are conceivable, for example a solid line or linear patterns of laser markings such as laser dots (dotted laser line or laser dashes (dashed laser line). Furthermore conceivable is also a two-dimensional laser marking, for example an (elongate) rectangle or the like. Alternatively or in addition, the laser marking can be in the form of a laser cross of at least two intersecting laser lines. In particular, an orthogonal laser cross is conceivable, in which two laser lines intersect at a right angle. The laser marking is produced on a remote object by a projection of the emitted laser radiation. The region of the object onto which the laser marking is emitted will be referred to below as the projection surface. In typical application scenarios of the laser leveling device, the projection surface is formed by a planar surface, for example a wall, a sloping roof, a floor or a ceiling.

The laser leveling device can be implemented in the form of a stationarily operable device and/or in the form of a handheld device.

A laser emission apparatus serves for the emission of the laser marking onto the projection surface. In one embodiment, the at least one laser emission apparatus is configured to emit an at least one-dimensional laser marking, in particular a laser line, and to project it onto the projection surface. The at least one laser emission apparatus for this purpose emits laser radiation in or with an emission direction onto the projection surface. The emission direction is here the direction in which the laser power is substantially, or on average, emitted. "Substantially" is understood to mean to a percentage of at least 60%, in particular at least 80%, very particularly at least 90%. For example, for a laser light emitted in the form of a beam, the emission apparatus is collinear with the emitted laser beam. In the case of an emitted laser plane (which, projected onto the projection surface, produces a laser line there), the emission direction is given for example by the direction into which the emission—with the assumption of a sufficiently great distance from the projection surface—substantially (i.e. on average) takes place. It should be noted that what is important for carrying out the present disclosure is the emission direction that is realized by the at least one laser emission apparatus, and not necessarily the manner in which the emission of the laser radiation is realized.

In one embodiment, the at least one laser emission apparatus can be implemented in particular as at least one beam-shaping and/or beam-steering optical element and/or as an optical element that influences the properties of the laser radiation, in particular for example as a lens element, filter, diffractive element, mirror, reflector, optically transparent plate or the like, or can at least comprise such an optical element. "Optical unit" in the following text will refer to any selection and/or combination of such optical elements. In particular, cylindrical lenses can be used in order to bring about in a technically simple manner a fanning-out of a laser beam emitted by a laser light source into a laser plane, so that, when this laser plane is projected onto the projection surface, a laser line is produced. The emission direction in this embodiment, in which the optical unit is used as a laser emission apparatus, is defined or determined by the optical unit. For example, due to its refractive properties, the aforementioned cylindrical lens defines the emission direction of the laser plane that is produced and emitted thereby.

In an alternative or additional embodiment, the at least one laser emission apparatus has at least one laser light source for producing the optical laser marking on the projection surface, for example a laser, a semiconductor laser, or a laser diode.

In an alternative or additional embodiment, the at least one laser emission apparatus has a laser light source and an optical unit. For example, the optical unit can be selected as a diffractive element for converting the laser beam emitted by the laser light source into a laser plane in order to produce the at least one-dimensional laser marking, in particular the laser line. The diffractive element and laser light source together in this embodiment form the laser emission apparatus.

Furthermore, the at least one laser emission apparatus can also have non-optical elements, for example means for adjustment and/or electronic circuits for controlling the laser light source and/or for controlling other components of the laser emission apparatus.

The first sensor apparatus serves for ascertaining an actual alignment of the at least one laser emission apparatus with respect to the projection surface. The first sensor apparatus consequently likewise serves for ascertaining an actual alignment of the at least one laser marking, which is emitted by means of the at least one laser emission apparatus, with respect to the projection surface. "With respect to" should herein be understood to mean in particular "in relation to."

In one embodiment of the laser leveling device, the first sensor apparatus comprises at least one distance sensor for contactless distance measurement in a distance measurement direction, wherein the distance sensor is mounted so as to be movable, in particular rotatable or settable, with respect to a rotation axis, wherein the distance measurement device forms a specified angle to the rotation axis, wherein the first sensor apparatus is configured to ascertain, based on at least three distance measurements in different directions, i.e. with different relative arrangements of the distance sensor to the rotation axis, the actual alignment of the at least one laser emission apparatus with respect to the projection surface. The distance sensor can here in particular be implemented in the form of a laser rangefinder and/or an ultrasonic rangefinder and/or a radar rangefinder. For example, the distance sensor can be implemented as a SPAD laser rangefinder. The specified angle can be in particular an acute angle of less than 90°, in particular of less than 60°, very particularly of less than 30° (opening of the angle in the direction of the projection surface). In the event of a complete rotation of the distance sensor about the rotation axis, a target point with respect to which the distance sensor ascertains on the projection surface a distance here describes an ellipse on the projection surface. Based on the at least three distance measurements, a relative alignment of the at least one laser emission apparatus with respect to the projection surface can be determined by calculation. In particular, at least two vectors lying in the projection plane can be determined from at least three distance measurements $A_1$, $A_2$, $A_3$ including the associated angles $\rho_1$, $\rho_2$, $\rho_3$, wherein a respective vector connects in each case the target points of two distance measurements. For example, a first vector can be defined between the target points of the distance measurements A1, A2, and a second vector can be defined between the target points of the distance measurements A2, A3. Using these vectors, it is then possible by calculating the vector cross product to calculate a normal vector of the projection surface, and the use of said vector in turn allows the ascertainment of an actual alignment of the at least one laser emission apparatus with respect to the projection surface. It is furthermore conceivable to carry out a multiplicity of distance measurements to a multiplicity of target points on the ellipse.

In an alternative or additional embodiment of the laser leveling device, the first sensor apparatus comprises at least three distance sensors, arranged at a distance from or at an angle to one another, for the contactless distance measurement, wherein the first sensor apparatus is configured to ascertain, based on three distance measurements of the distance sensors, the actual alignment of the at least one laser emission apparatus with respect to the projection surface. In this way, a movable, in particular rotatable or settable, mounting of an (in particular individual) distance sensor can be omitted, and a mechanically particularly robust laser leveling device is thus implementable.

In an alternative or additional embodiment of the laser leveling device, the first sensor apparatus comprises at least one spatially-resolving time-of-flight distance sensor for capturing spatially resolved distance measurements, wherein the first sensor apparatus is configured to ascertain, based on the spatially resolved distance measurements, the actual alignment of the at least one laser emission apparatus with respect to the projection surface. A time-of-flight distance sensor is known in principle to a person skilled in the art. In this way, a particularly fast ascertainment of the actual alignment of the at least one laser emission apparatus with respect to the projection surface can be carried out.

In an alternative or additional embodiment of the laser leveling device, the first sensor apparatus comprises at least one stereo camera, wherein the first sensor apparatus is configured to ascertain, based on image data from the stereo camera, the actual alignment of the at least one laser emission apparatus with respect to the projection surface. Alternatively or additionally, the first sensor apparatus can also comprise what is known as an "active stereo camera," in which a pattern or the like is projected onto the projection surface by means of an additional projector to produce features that are detectable in the image data (in particular suitable for projection surfaces having few structures, such as white walls).

In an alternative or additional embodiment of the laser leveling device, the first sensor apparatus comprises a laser for emitting laser radiation in a transmission direction, wherein the laser is mounted so as to be movable, in particular rotatable or settable, with respect to a rotation axis, wherein the laser forms a specified angle to the rotation axis, at least one camera for capturing at least one image of an image surrounding area, wherein the first sensor apparatus is configured to capture at least one image during the emission of laser radiation in at least three different directions, wherein the image surrounding area comprises at least the laser radiation projected onto the projection surface, and to ascertain from the at least one image the actual alignment of the at least one laser emission apparatus with respect to the projection surface.

In this way, a laser leveling device that has a particularly simple construction can be implemented. The first sensor apparatus is here configured to carry out an image evaluation or image analysis and to ascertain an actual alignment of the at least one laser emission apparatus with respect to the projection surface from the position of the target points in the at least one image.

In an alternative or additional embodiment of the laser leveling device, the first sensor apparatus comprises at least three lasers arranged at an angle to one another for emitting laser radiation in each case in one transmission direction, at least one camera for capturing at least one image of an image surrounding area, wherein the first sensor apparatus is configured to capture at least one image during the emission of laser radiation in the at least three transmission directions, wherein the image surrounding area comprises at least the laser radiation projected onto the projection surface, and to ascertain the actual alignment of the at least one laser emission apparatus with respect to the projection surface from the at least one image.

In this way, a movable, in particular rotatable or settable, mounting of a laser can be omitted, and a mechanically particularly robust laser leveling device is thus implementable.

"Ascertain" is in particular to be understood to mean that a statement or information is derived that allows a conclusion to be drawn relating to the actual alignment of the at least one laser emission apparatus with respect to the projection surface. For example, it is in particular conceivable that, using the first sensor apparatus, initially an actual alignment of another (further) component—for example a housing or the first sensor apparatus itself—with respect to the projection surface is determined, wherein subsequently an actual alignment of the at least one laser emission apparatus with respect to the projection surface can be ascertained or calculated at least indirectly via the actual alignment of the other component with respect to the projection surface from a known reference of the at least one laser emission apparatus to the other component for example via a motor position or a construction-related relative arrangement or the like.

The control apparatus serves for controlling, in particular the operation of, the laser leveling device. The control apparatus is configured at least for calculating the desired alignment of the at least one laser emission apparatus on the basis of at least the ascertained actual alignment of the at least one laser emission apparatus with respect to the projection surface. For this purpose, the control apparatus has at least a processor, a memory, and an operating program with evaluation routines and/or calculation routines and/or control routines. In particular, the control apparatus is connected, for the exchange of signals, to further components of the laser leveling device, for example a positioning apparatus, a laser light source, the first sensor apparatus, or the like. The evaluation routines and/or calculation routines in particular comprise suitable and specifically parameterized functions, for example trigonometric functions, so as to be able to calculate a respective desired alignment of the at least one laser emission apparatus on the basis of an actual alignment of the at least one laser emission apparatus with respect to the projection surface, in particular on the basis of the actual alignment with respect to the projection surface and an actual alignment, with respect to a reference outside the device.

"Provided" or "configured" is to be understood to mean in the following text specifically "programmed," "designed," "conceived" and/or "equipped." An object being "provided" or "configured" for a specific function is in particular to be understood to mean that the object fulfills and/or carries out this specific function in at least one application and/or operating state or is designed to fulfill the function.

The positioning apparatus serves for aligning the at least one laser emission apparatus in accordance with the desired alignment. In one embodiment, the positioning apparatus is configured to align the laser emission apparatus, i.e. the optical unit and/or the laser light source. In one embodiment of the laser leveling device, the at least one laser emission apparatus is rotatable at least about a first axis using the positioning apparatus. In particular, the first axis extends parallel or collinearly to the emission direction of the at least one laser emission apparatus. If the laser emission apparatus for example sends a laser line onto the projection surface, said laser line can be changed in its slope angle by rotating the laser emission apparatus. In other words, the laser line on the projection surface can be rotated. The rotation can here also be limited to a specific angle range, for example due to the construction. The rotation about the first axis defines what is known as a roll angle of the laser emission apparatus.

In an alternative or additional embodiment of the laser leveling device, the at least one laser emission apparatus is rotatable at least about a second axis using the positioning apparatus. If the at least one laser emission apparatus sends for example a laser line onto the projection surface, the alignment of the laser line can be changed in a further degree of freedom by rotating the at least one laser emission apparatus about the second axis. The rotation can here likewise be limited to a specified angle range. In an exemplary embodiment, the first axis and the second axis are substantially orthogonal to each other. "Substantially orthogonal" is in particular to be understood to mean that the two axes have a maximum deviation from an orthogonal arrangement that is less than 15%, in particular less than 10%, very particularly less than 5%. In particular, the rotation about the second axis can define what is known as a pitch angle (also: elevation angle or vertical angle or height angle) of the at least one laser emission apparatus and thus of the emission direction. If this pitch angle changes, a height (also: elevation or altitude), that is to say a vertical position, of the laser marking emitted onto the projection surface changes as a result.

In an alternative or additional embodiment of the laser leveling device, the at least one laser emission apparatus is rotatable at least about a third axis using the positioning apparatus. If the at least one laser emission apparatus for example sends a laser line onto the projection surface, the alignment of the laser line can be changed again in a further degree of freedom by rotating the at least one laser emission apparatus about the third axis. The rotation can here likewise be limited to a specified angle range. In an exemplary embodiment, the second axis and the third axis are substantially orthogonal to each other. In particular, the rotation about the third axis can define what is known as a yaw angle (also: azimuth angle or horizontal angle) of the at least one laser emission apparatus and thus of the emission direction. If this yaw angle changes, a horizontal direction (also: azimuth), i.e. a horizontal position, of the laser marking emitted onto the projection surface changes as a result.

In particular it is conceivable that the three axes define a Cartesian coordinate system. The positioning apparatus advantageously makes it possible to freely align the at least one laser emission apparatus in a plurality of degrees of freedom, in particular in at least 3 degrees of freedom.

In an embodiment of the laser leveling device, the positioning apparatus has a first positioning element, in particular a roll positioning element, for rotating the at least one laser emission apparatus about the first axis. Alternatively or additionally, the positioning apparatus has a second positioning element, in particular a pitch positioning element, for rotating the at least one laser emission apparatus about second axis. Again alternatively or additionally, the positioning apparatus has a third positioning element, in particular a yaw positioning element, for rotating the at least one laser emission apparatus about the third axis. A positioning element is in particular to be understood to mean an apparatus or a mechanism of the positioning apparatus that serves for actively setting or changing the alignment of the at least one laser emission apparatus. In particular, the alignment of the at least one laser emission apparatus by means of the positioning elements can be changed until a requested desired alignment of the at least one laser emission apparatus is reached. The first positioning element here serves for actively aligning the at least one laser emission apparatus about the first axis, the second positioning element serves for actively aligning the at least one laser emission apparatus about the second axis, and/or the third positioning element serves for actively aligning the at least one laser emission apparatus about the third axis.

In one embodiment of the laser leveling device, at least one of the positioning elements comprises an electromechanical actuator. In one exemplary embodiment, all positioning elements, that is to say the first positioning element and the second positioning element and the third positioning element, comprise an electromechanical actuator for producing a movement for aligning the at least one laser emission apparatus. Conceivable as an electromechanical actuator is for example an electric motor, in particular a servo motor, and/or a piezo element. An electromechanical actuator is suitable in particular for carrying out automated alignment of the at least one laser emission apparatus in accordance with the desired alignment. In one exemplary embodiment, the positioning elements are controlled, in particular by closed-loop control, by the control apparatus of the laser leveling device. In particular, a "self-leveling" laser leveling device can in this way be specified.

In an alternative or additional embodiment of the laser leveling device, at least one of the positioning elements, in particular the first positioning element and the second positioning element and the third positioning element, are actuable manually, in particular mechanically. "Actuable manually" is in particular to be understood to mean that a user of the laser leveling device can carry out a manual alignment of the at least one laser emission apparatus using the positioning element. For example, it is conceivable that a positioning element is implemented in the form of a mechanical setscrew, wherein an alignment of the at least one laser emission apparatus can be changed, and thus a desired alignment can be achieved, manually by rotating the setscrew—in particular also in addition to motorized actuation by way of an electromechanical actuator.

In one embodiment of the laser leveling device, the laser leveling device has an output apparatus, by means of which information relating to an actuation of the first positioning element and/or of the second positioning element and/or of the third positioning element that is to be carried out—to achieve the desired alignment—is able to be output to a user. An "output apparatus" is to be understood to mean a means that is provided to output at least one changing piece of information acoustically, optically and/or haptically to a user. The output can be realized for example by means of a screen, in particular a touch-sensitive screen. Alternatively or additionally, it is conceivable that information to be output or events are also output to a data-processing system. The latter comprises at least an output of information to an external device such as a smart phone, a tablet PC, a PC and to any other external data device that appears reasonable to a person skilled in the art, and which device is connected to the laser leveling device via a data communication interface of the latter. In particular, the output apparatus can be accommodated directly in the housing of the laser leveling device and can additionally also be supplemented by an external output apparatus. By using the information that is output by means of the output apparatus to a user of the laser leveling device, it is possible for the user to actuate the positioning elements in a manner such that the desired alignment of the at least one laser emission apparatus is achieved. Furthermore, further information can be output by means of the output apparatus, for example an alert if a laser line emitted onto the projection surface is not "horizontal".

In one embodiment of the laser leveling device, the laser leveling device has an input apparatus, by means of which a slope angle is specifiable by a user that the, in particular one-dimensional, laser marking on the projection surface is intended to have, wherein the control apparatus is configured to calculate the desired alignment of the at least one laser emission apparatus in a manner such that the laser marking is emittable, in particular emitted, at the specified slope angle. In particular, the slope angle with respect to a reference outside the device, for example the direction of gravity (vertical) or the horizon (horizontal), can be specified. If no such information is input by the user, it is conceivable that the laser leveling device automatically sets or adjusts a predefined slope angle, for example 0° or 90°. An "input apparatus" is to be understood to mean a means that is provided to provide to the laser leveling device at least one piece of information acoustically, optically and/or haptically by way of the user. The input can be realized for example by means of a touch-sensitive screen and/or a key pad and/or operating elements of various types. Alternatively or additionally, it is conceivable to input information that is to be input by means of a data-processing system such as a smart phone, which is connected to the laser leveling device via a data communication interface of the latter. The input apparatus can furthermore serve for switching the emission of the laser marking on and off.

In one embodiment of the laser leveling device, the laser leveling device has an apparatus for checking an alignment of the laser leveling device, in particular of the at least one laser emission apparatus, with respect to a reference outside the device. The reference outside the device can in particular be provided by the direction of gravity and/or the Earth's magnetic field. The apparatus for checking the alignment can be implemented for example by way of a spirit level and/or an inclination sensor, in particular an acceleration sensor and/or an angular rate sensor and/or a magnetic field sensor and/or an electro-optic level and/or an electrolytically operating sensor, wherein the inclination sensor outputs an alignment of the laser leveling device to the user by means of the output apparatus. In this way, it is possible to ensure in a particularly simple manner that a defined reference of the at least one laser emission apparatus to a reference outside the device is producible at least indirectly. In particular, it is conceivable that the control apparatus is configured such that the calculation of the desired alignment of the at least one laser emission apparatus takes place on the basis of at least the ascertained actual alignment with respect to the projection surface, wherein the calculation takes place under the assumption that the laser leveling device, in particular the laser emission apparatus, has already been aligned with respect to the reference outside the device ("pre-leveled") by means of the apparatus for checking an alignment. If the laser marking is realized for example by a laser line, it is possible to achieve that the laser line on the projection surface is aligned horizontally (perpendicular to the direction of gravity) or vertically (in the direction of gravity) or at a defined slope angle (with respect to the reference outside the device) that is in particular specified by the user.

The "reference outside the device" is in particular to be understood to mean a reference variable that is independent and external to the laser leveling device, in particular a direction. The reference outside the device can be realized for example as the direction of gravity and/or as the North direction of the Earth's magnetic field. Alternatively or additionally, the reference outside the device can also be freely definable by the user of the laser leveling device. For example, when using the laser leveling device in the internal construction of a building, proceeding from a slightly inclined wall, the reference outside the device can be defined by the "up-down" direction of that wall—i.e. a vertical is given by this slightly inclined wall (in other words: the alignment of the slightly inclined wall replaces the vertical direction).

In an alternative or additional embodiment of the laser leveling device, the laser leveling device has a second sensor apparatus for ascertaining an actual alignment of the at least one laser emission apparatus with respect to at least one reference outside the device, wherein the control apparatus is configured for calculating the desired alignment of the at least one laser emission apparatus on the basis of the ascertained actual alignment of the at least one laser emission apparatus with respect to the reference outside the device and the ascertained actual alignment or the at least one laser emission apparatus with respect to the projection surface. The second sensor apparatus serves for ascertaining an actual alignment of the at least one laser emission apparatus with respect to at least one reference outside the device. The second sensor apparatus likewise thus serves for ascertaining an actual alignment of the at least one laser marking, in particular laser line, emitted by means of the laser emission apparatus, with respect to the reference outside the device. In particular, aligning the laser leveling device (for example as explained above in connection with the apparatus for checking an alignment) can in this way be omitted, since an alignment of the laser leveling device has already been taken into account in the calculation of the desired alignment of the at least one laser emission apparatus. The laser leveling device can therefore be simplified and automated further in terms of its use. A use of the laser leveling device on uneven ground an handheld use can furthermore also be made possible. In particular, it is possible to ensure that a rotation of the at least one laser emission apparatus about the second axis defines an elevation angle or vertical angle of the emission direction with respect to the at least one reference outside the device (for example with respect to the direction of gravity, see below), or that a rotation of the at least one laser emission apparatus about the third axis defines an azimuth angle (horizontal angle) of the emission direction with respect to the at least one reference outside the device (for example with respect to the Earth's magnetic field, see below).

In one embodiment of the laser leveling device, the second sensor apparatus is configured to ascertain the actual alignment of the at least one laser emission apparatus with respect to the direction of gravity and/or with respect to the Earth's magnetic field as the reference outside the device. In this way, it is possible to achieve that a defined reference of the at least one laser emission apparatus to a vertical or horizontal and/or a spatial direction (compass direction) can be established. It is furthermore possible to achieve in this way that the, in particular one-dimensional, laser marking is emitted onto the projection surface leveled with respect to the reference outside the device. If the laser marking is implemented for example by way of a laser line, it is possible to advantageously achieve that the laser line on the projection surface is aligned horizontally (perpendicularly to the direction of gravity) or vertically (in the direction of gravity) or at a defined slope angle (with respect to the direction of gravity) specified in particular by the user. In particular, it is possible in this way to produce laser markings, in particular to project them onto the projection surface, which represent a reference independent of an alignment of floors, ceilings, walls or other objects, for example the vertical wall of a cabinet, but in particular also independent of the alignment of a housing of the laser leveling device.

In one embodiment of the laser leveling device, the second sensor apparatus has at least one inclination sensor, in particular an acceleration sensor and/or an angular rate sensor and/or a magnetic field sensor and/or an electro-optical level and/or an electrolytically operating sensor. Such sensors allow a simple integration, in particular with a small construction size, into the laser leveling device while at the same time reliably ascertaining a reference to the reference outside the device.

In one embodiment of the laser leveling device, the laser leveling device comprises at least one further laser emission apparatus for emitting a further, in particular one-dimensional, laser marking, in particular a laser line, in a further emission direction onto the projection surface, wherein a further actual alignment of the at least one further laser emission apparatus with respect to the projection surface is ascertainable by means of the first sensor apparatus and/or wherein a further actual alignment of the at least one further laser emission apparatus with respect to the projection surface is ascertainable by means of at least one further first sensor apparatus for ascertaining a further actual alignment of the at least one further laser emission apparatus with respect to the projection surface, wherein the control apparatus is furthermore configured for calculating a further desired alignment of the at least one further laser emission apparatus based on the ascertained further actual alignment with respect to the projection surface, and also a further positioning apparatus for aligning the at least one further laser emission apparatus in accordance with the further desired alignment.

In this way, it is possible to specify a laser leveling device that can emit a plurality of laser markings onto the projection surface. For example, parallel laser lines with a defined, in particular specifiable, distance between them and/or orthogonally intersecting laser lines (laser cross) and/or laser lines that intersect at a defined, in particular specifiable, angle can thus be emitted onto the projection surface.

In particular, each further positioning apparatus likewise has three axes about which each further laser emission apparatus is rotatable. For this purpose, each further positioning apparatus likewise has positioning elements. In one embodiment, each further laser emission apparatus is likewise rotatable about a further first axis using the respective further positioning apparatus. In this way, the respective further first axis can extend parallel or collinearly to the emission direction of the respective further laser emission apparatus. Furthermore, a respective further second axis of the respective further positioning apparatus can here be identical to the second axis of the (first) positioning apparatus—for example for setting the pitch angle of the respective further laser emission apparatus. In particular, second positioning elements of the (first) positioning apparatus and of each further positioning apparatus can be identical, i.e. the same structural part. Furthermore, a respective further third axis of the respective further positioning apparatus can here be identical to the third axis of the (first) positioning apparatus—for example for setting the yaw angle of the respective further laser emission apparatus. In particular, third positioning elements of the (first) positioning apparatus and of each further positioning apparatus can be identical, i.e. the same structural part.

In one exemplary embodiment, the laser leveling device has two laser emission apparatuses for emitting two one-dimensional laser markings the form of laser lines. The laser leveling device has two positioning apparatuses for aligning the respective laser emission apparatuses in accordance with a respective desired alignment. The first positioning apparatus comprises a first (roll) positioning element, a second (pitch) positioning element and a third (yaw) positioning element, with the result that the first laser emission apparatus is rotatable about three axes in three degrees of freedom. The second positioning apparatus likewise comprises a first (roll) positioning element, a second (pitch) positioning element and a third (yaw) positioning element, with the result that the second laser emission apparatus is also rotatable about three axes in three degrees of freedom. In one variant, all positioning elements for the respective positioning apparatus are provided as separate structural parts (i.e. six positioning elements). In a second variant, the third (yaw) positioning element for both positioning apparatuses is implemented in the form of an identical positioning element (common structural part) (i.e. five positioning elements). In one alternative or additional third variant, the second (pitch) positioning element for both positioning apparatuses is likewise implemented in the form of an identical positioning element (common structural part) (i.e. four positioning elements). An actual alignment of the two laser emission apparatuses with respect to the projection surface is indirectly ascertainable by means of a first sensor apparatus of the laser leveling device by initially capturing an actual alignment of the laser leveling device (for example the housing, but at least the first sensor apparatus) with respect to the projection surface and then calculating the actual alignment of the two laser emission apparatuses from a position of the positioning elements (here, for example, implemented in the form of step motors). Alternatively, it is conceivable that each laser emission apparatus has a separate assigned first sensor apparatus for ascertaining the respective actual alignment. The control apparatus is configured for calculating the two desired alignments of the two laser emission apparatuses on the basis of the respective actual alignments with respect to the projection surface.

It is here conceivable in principle to select a color of a respective laser marking that is differentiable from a color of a further laser marking, with the result that the laser markings are in principle distinguishable for a user of the laser leveling device. For example, a vertical laser line can be selected to be red, while a horizontal laser line is selected to be green. Alternatively or additionally, it is conceivable that the laser markings have differentiable patterns, for example differentiable forms of lines (short dashes, long dashes, dash-dot sequences, dots, . . . ) and/or differentiable emission forms such as flashing quickly, flashing slowly, intensity-variable, permanently illuminated, or the like.

It is furthermore conceivable in principle that the laser leveling device comprises at least one further second sensor apparatus for ascertaining a further actual alignment of the at least one further laser emission apparatus with respect to at least the reference outside the device, wherein the control apparatus is furthermore configured for calculating the further desired alignment of the at least one further laser emission apparatus on the basis of the ascertained further actual alignment with respect to the reference outside the device and the ascertained further actual alignment with respect to the projection surface.

One further aspect of the disclosure relates to a method for leveling using the laser leveling device according to the disclosure. The method comprises at least the method steps of:

aligning the at least one laser emission apparatus, in particular the emission direction of the at least one laser emission apparatus, toward the projection surface, in particular by a rotation about the second axis and/or third axis of the positioning apparatus, ascertaining an actual alignment of the at least one laser emission apparatus with respect to the projection surface using the at least one first sensor apparatus, calculating a desired alignment of the at least one laser emission apparatus on the basis of the ascertained actual alignment of the at least one laser emission apparatus with respect to the projection surface, using the control apparatus, aligning the at least one laser emission apparatus in accordance with the desired alignment using the positioning apparatus, in particular by rotating the laser emission apparatus about the first axis and/or the second axis and/or the third axis of the positioning apparatus.

It should be noted that the embodiments and exemplary embodiments encompassed in the description of the laser leveling device can likewise be transferred to the method according to the disclosure and consequently also apply to the method according to the disclosure and are disclosed.

In one embodiment of the method, an actual alignment of the at least one laser emission apparatus with respect to at least one reference outside the device using at least one second sensor apparatus is furthermore ascertained in the second method step, wherein the desired alignment of the at least one laser emission apparatus is calculated using the control apparatus on the basis of the ascertained actual alignment of the at least one laser emission apparatus with respect to the projection surface and on the basis of the ascertained actual alignment of the at least one laser emission apparatus with respect to the reference outside the device.

In one embodiment of the method, the at least one laser emission apparatus is aligned toward the projection surface by rotating the at least one laser emission apparatus about a second axis or about a second axis and a third axis. The rotation about the second axis here defines in particular the pitch angle, while the rotation about the third axis defines in particular the yaw angle.

In one embodiment of the method, information relating to an alignment, in particular rotation, to be performed—to achieve the desired alignment—of the at least one laser emission apparatus is output to a user of the laser leveling device by means of an output apparatus, in particular an output apparatus of the laser leveling device.

In one embodiment of the method, a slope angle that the, in particular one-dimensional, laser marking on the projection surface is to have is specified in a preceding method step by a user of the laser leveling device by means of an input apparatus of the laser leveling device, wherein the desired alignment of the laser emission apparatus is calculated by means of the control apparatus in a manner such that the laser marking is emitted at the specified slope angle. The slope angle can here be specified in particular with respect to a reference outside the device—as described, for example the direction of gravity and/or the Earth's magnetic field.

BRIEF DESCRIPTION OF THE DRAWINGS

The disclosure is explained in more detail in the following description by way of exemplary embodiments illustrated in the drawings. The drawings, the description, and the claims contain numerous features in combination. A person skilled in the art will expediently also consider the features individually and combine them to further meaningful combinations. Identical reference signs in the figures denote the same elements.

In the figures:

FIG. 7*a*-7*e* show detail views of the first sensor apparatus;

DETAILED DESCRIPTION

Figure 1:
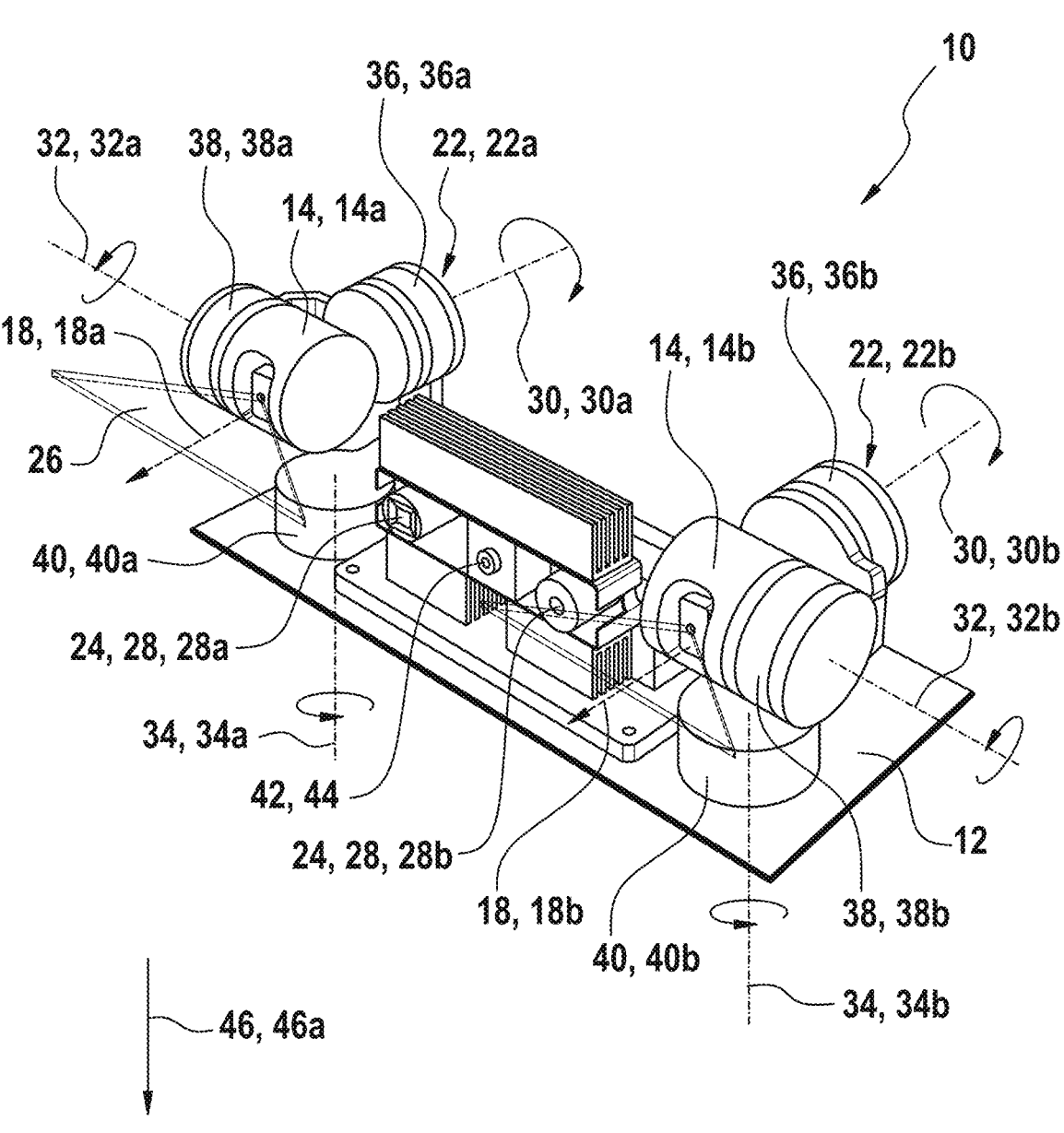
FIG. 1 shows a schematic view of an exemplary embodiment of the laser leveling device according to the disclosure.

FIG. 1 shows a schematic view of a first exemplary embodiment of the laser leveling device 10 according to the disclosure. The laser leveling device 10 serves for producing two optical laser markings 16, 16*a*, 16*b* as part of leveling, alignment, measurement and/or marking tasks (see FIG. 3*a*).

The laser leveling device 10 comprises a base plate 12, which is here part of a housing (not illustrated further) of the laser leveling device 10. The base plate 12 serves for receiving and attaching a first laser emission apparatus 14, 14*a* for emitting a first one-dimensional laser marking 16, 16*a*, here a laser line, in a first emission direction 18, 18*a* onto a projection surface 20 (not illustrated here in more detail, but see FIGS. 3*a*, 4*a*, 5*a*). The first laser emission apparatus 14, 14*a* in this exemplary embodiment comprises a laser diode as the laser light source for producing and emitting laser radiation and a cylindrical lens as an optical unit for converting the laser radiation into a laser plane 26 (laser light source and cylindrical lens are here not illustrated in more detail, but known to a person skilled in the art). The first laser emission apparatus 14, 14*a* is movably mounted to a first positioning apparatus 22, 22*a*, wherein the first positioning apparatus 22, 22*a* serves for aligning the first laser emission apparatus 14, 14*a* in accordance with a first desired alignment.

The base plate 12 furthermore serves for receiving a second laser emission apparatus 14, 14*b* for emitting a second one-dimensional laser marking 16, 16*b*, here likewise a laser line, in a second emission direction 18, 18*b* onto the projection surface 20. The second laser emission apparatus 14, 14*b* is movably mounted to a second positioning apparatus 22, 22*b*, wherein the second positioning apparatus 22, 22*b* serves for aligning the second laser emission apparatus 14, 14*b* in accordance with a second desired alignment.

The first and the second positioning apparatus 22, 22*a*, 22*b* are configured to align or position the first and, respectively, second laser emission apparatus 14, 14*a*, 14*b*, that is to say the laser light source and the cylindrical lens, in accordance with a respective desired alignment. For this purpose, the first laser emission apparatus 14, 14*a* can be rotated about a first axis 30, 30*a* of the first positioning apparatus 22, 22*a* using a first positioning element 36, 36*a* of the first positioning apparatus 22, 22*a*. In addition, the first laser emission apparatus 14, 14*a* can be rotated about a second axis 32, 32*a* of the first positioning apparatus 22, 22*a* using a second positioning element 38, 38*a* of the first positioning apparatus 22, 22*a*. Next, the first laser emission apparatus 14, 14*a* can be rotated about a third axis 34, 34*a* of the first positioning apparatus 22, 22*a* using a third positioning element 40, 40*a* of the first positioning apparatus 22, 22*a*. The first axis 30, 30*a*, the second axis 32, 32*a* and the third axis 34, 34*a* of the first positioning apparatus 22, 22*a* are each perpendicular to one another and form a Cartesian coordinate system. The second laser emission apparatus 14, 14*b* can likewise be rotated about a first axis 30, 30*b* of the second positioning apparatus 22, 22*b* using a first positioning element 36, 36*b* of the second positioning apparatus 22, 22*b*. In addition, the second laser emission apparatus 14, 14*b* can be rotated about a second axis 32, 32*b* of the second positioning apparatus 22, 22*b* using a second positioning element 38, 38*b* of the second positioning apparatus 22, 22*b*. Next, the second laser emission apparatus 14, 14*b* can also be rotated about a third axis 34, 34*b* of the second positioning apparatus 22, 22*b* using a third positioning element 40, 40*b* of the second positioning apparatus 22, 22*b*. The first axis 30, 30*b*, the second axis 32, 32*b* and the third axis 34, 34*b* of the second positioning apparatus 22, 22*b* are likewise in each case perpendicular to one another and form a Cartesian coordinate system.

The positioning elements 36, 36*a*, 36*b*, 38, 38*a*, 38*b*, 40, 40*a*, 40*b* of both positioning apparatuses 22, 22*a*, 22*b* are in each case implemented as actuators in the form of actuable servo motors (step motors) (not illustrated here in more detail). The rotation about each of the previously mentioned axes 30, 30*a*, 30*b*, 32, 32*a*, 32*b*, 34, 34*a*, 34*b* is enabled without limitation (i.e. multiple rotations are possible in principle).

The laser leveling device 10 has a first sensor apparatus 24 for ascertaining an actual alignment of the first laser emission apparatus 14, 14*a* and of the second laser emission apparatus 14, 14*b* with respect to the projection surface 20. The first sensor apparatus 24 comprises a stereo camera 28, comprising two cameras 28*a*, 28*b*, which are arranged at a distance from one another and here operate in the visual spectrum. The two cameras 28*a*, 28*b* enable, under synchronous or substantially temporally simultaneous recording of images of the scenery from directions or perspectives that differ (slightly) due to the construction, the simultaneous recording of stereoscopic image fields required for 3D images. Such stereo cameras 28 are known to a person skilled in the art. The first sensor apparatus 24 is configured to ascertain the actual alignment of the first laser emission apparatus 14, 14*a* and the actual alignment of the second laser emission apparatus 14, 14*b* with respect to the projection surface 20 on the basis of image data from the stereo camera 28. In this case, the actual alignment of the base plate 12 (in particular tie housing) carrying the stereo camera 28 with respect to the projection surface 20 is in fact determined. By using the positions (e.g. angular positions or step positions) of the step motors of the positioning elements 36, 36*a*, 38, 38*a*, 40, 40*a* of the first positioning apparatus 22, 22*a* and, respectively, the positions of the servo motors of the positioning elements 36, 36*b*, 38, 38*b*, 40, 40*b* of the second positioning apparatus 22, 22*b*, it is then possible to indirectly calculate the actual alignment of the first laser emission apparatus 14, 14*a* and, respectively, the actual alignment of the second laser emission apparatus 14, 14*b* with respect to the projection surface 20. The first sensor apparatus 24 (alternatively, also the control apparatus of the laser leveling device 10) is configured for carrying out this calculation.

The laser leveling device 10 has a second sensor apparatus 44 for ascertaining an actual alignment of the first laser emission apparatus 14, 14*a* and an actual alignment of the second laser emission apparatus 14, 14*b* with respect to the direction or gravity 46*a* as a reference 46 outside the device. For this purpose, the second sensor apparatus 44 comprises an inclination sensor, here in the form of an acceleration sensor and an angular rate sensor (not illustrated further). In this case, too, the actual alignment of the base plate 12 (in particular the housing) carrying the second sensor apparatus 44 with respect to the reference 46 outside the device is in fact determined. The actual alignment of the first laser emission apparatus 14, 14*a* and, respectively, the actual alignment of the second laser emission apparatus 14, 14*b* with respect to the reference 46 outside the device, here the direction of gravity 46*a*, can then be indirectly calculated again with the use of the positions of the servo motors of the positioning elements 36, 36*a*, 36, 38*a*, 40, 40*a* of the first positioning apparatus 22, 22*a* and, respectively, the positions of the servo motors of the positioning elements 36, 36*b*, 38, 38*b*, 40, 40*b* of the second positioning apparatus 22, 22*b*. The second sensor apparatus 44 (alternatively also the control apparatus of the laser leveling device 10) is configured for carrying out this calculation.

The laser leveling device 10 furthermore comprises a control apparatus 42. The control apparatus 42 serves for controlling, in particular operating, the laser leveling device 10. The control apparatus 42 has a processor, a memory, and at least one operating program with calculation routines and control routines. The control apparatus 42 is connected for the exchange of signals to the further components of the laser leveling device 10, here to the first sensor apparatus 24, the second sensor apparatus 44, the first positioning apparatus 22, 22*a*—in particular to the servo motors of the positioning elements 36, 36*a*, 38, 38*a*, 40, 40*a* of the first positioning apparatus 22, 22*a*—, the second positioning apparatus 22, 22*b*—in particular to the servo motors of the positioning elements 36, 36*b*, 38, 38*b*, 40, 40*b* of the second positioning apparatus 22, 22*b*—, and to the laser light source for controlling them. The control apparatus 42 is specifically configured to calculate a desired alignment of the first laser emission apparatus 14, 14*a* on the basis of the actual alignment of the first laser emission apparatus 14, 14*a* with respect to the projection surface 20 and with respect to the reference 46 outside the device, and to calculate a desired alignment of the second laser emission apparatus 14, 14*b* on the basis of the actual alignment of the second laser emission apparatus 14, 14*b* with respect to the projection surface 20 and with respect to the reference 46 outside the device. Furthermore, the control apparatus 42 is configured to control the servo motors in a targeted manner such that the first laser emission apparatus 14, 14*a* and the second laser emission apparatus 14, 14*b* adopt their respective desired alignments.

Figure 2:
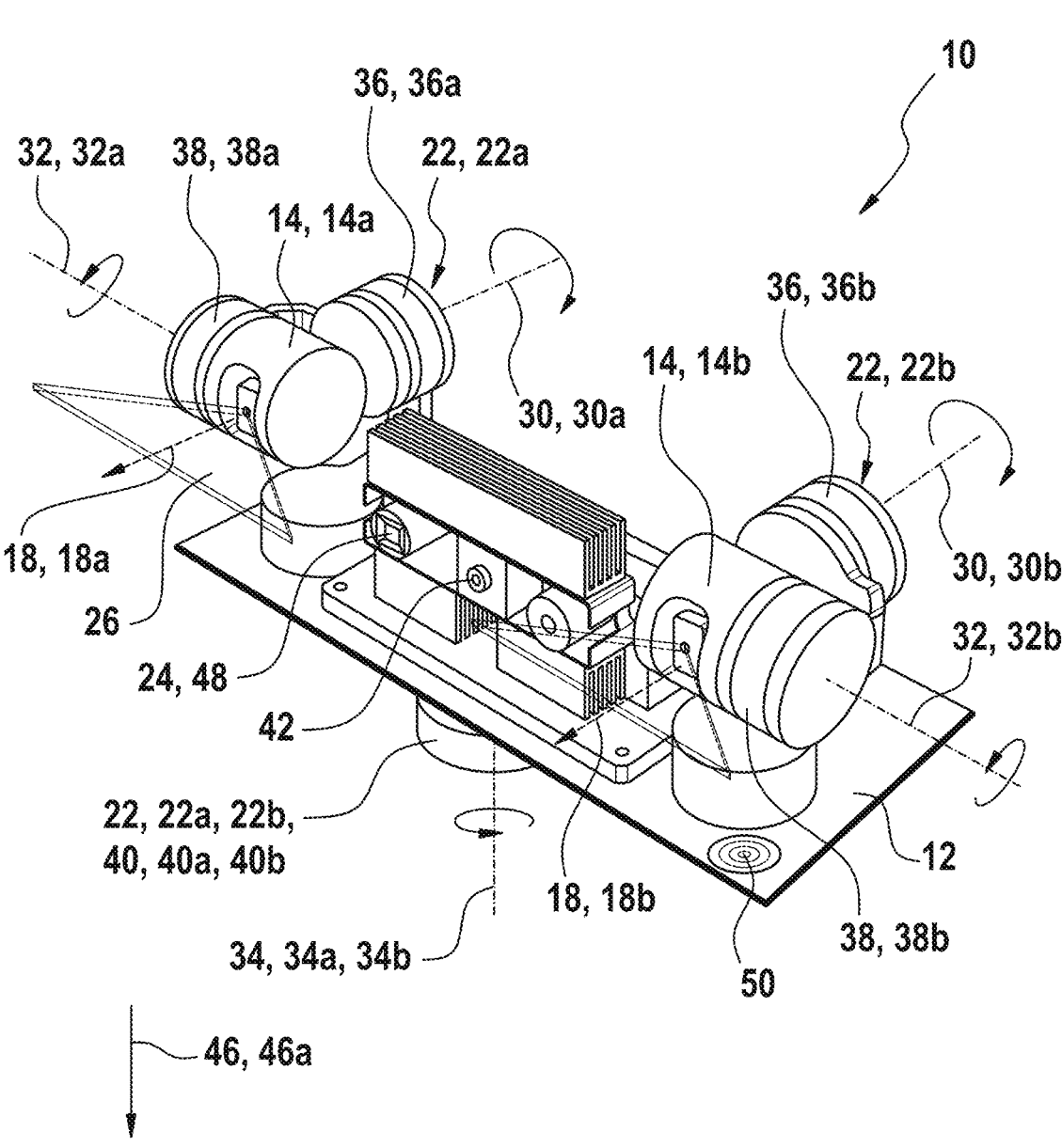
FIG. 2 shows a schematic view of an alternative exemplary embodiment of the laser leveling device according to the disclosure.

FIG. 2 shows a schematic view of a first alternative exemplary embodiment of the laser leveling device 10 according to the disclosure. The laser leveling device 10 comprises a base plate 12, which is here part of a housing (not illustrated further) of the laser leveling device 10. The base plate 12 serves for receiving and attaching a first laser emission apparatus 14, 14*a* for emitting a first one-dimensional laser marking 16, 16*a*, here a laser line, in a first emission direction 18, 18*a* onto a projection surface 20 (not illustrated here in more detail, but see FIG. 3*a*). The first laser emission apparatus 14, 14*a* in this exemplary embodiment comprises a laser diode as the laser light source for producing and emitting laser radiation and a cylindrical lens as an optical unit for converting the laser radiation into a laser plane 26 (laser light source and cylindrical lens are here not illustrated in more detail). The first laser emission apparatus 14, 14*a* is movably mounted to a first positioning apparatus 22, 22*a*, wherein the first positioning apparatus 22, 22*a* serves for aligning the first laser emission apparatus 14, 14*a* in accordance with a first desired alignment. The base plate 12 furthermore serves for receiving a second laser emission apparatus 14, 14*b* for emitting a second one-dimensional laser marking 16, 16*b*, here likewise a laser line, in a second emission direction 18, 18*b* onto the projection surface 20. The second laser emission apparatus 14, 14*b* is movably mounted to a second positioning apparatus 22, 22*b*, wherein the second positioning apparatus 22, 22*b* serves for aligning the second laser emission apparatus 14, 14*b* in accordance with a second desired alignment.

The first and the second positioning apparatus 22, 22*a*, 22*b* are configured to align or position the first laser emission apparatus 14, 14*a* and, respectively, the second laser emission apparatus 14, 14*b*, that is to say the laser light source and the cylindrical lens, in accordance with a respective desired alignment. For this purpose, the first laser emission apparatus 14, 14*a* can be rotated about a first axis 30, 30*a* of the first positioning apparatus 22, 22*a* using a first positioning element 36, 36*a* of the first positioning apparatus 22, 22*a*. In addition, the first laser emission apparatus 14, 14*a* can be rotated about a second axis 32, 32*a* of the first positioning apparatus 22, 22*a* using a second positioning element 38, 38*a* of the first positioning apparatus 22, 22*a*. Finally, the first laser emission apparatus 14, 14*a* can be rotated about a third axis 34, 34*a* of the first positioning apparatus 22, 22*a* using a third positioning element 40, 40*a* of the first positioning apparatus 22, 22*a*. The first axis 30, 30*a*, the second axis 32, 32*a* and the third axis 34, 34*a* of the first positioning apparatus 22, 22*a* are each perpendicular to one another and form a Cartesian coordinate system. The second laser emission apparatus 14, 14*b* can likewise be rotated about a first axis 30, 30*b* of the second positioning apparatus 22, 22*b* using a first positioning element 36, 36*b* of the second positioning apparatus 22, 22*b*. In addition, the second laser emission apparatus 14, 14*b* can be rotated about a second axis 32, 32*b* of the second positioning apparatus 22, 22*b* using a second positioning element 38, 38*b* of the second positioning apparatus 22, 22*b*. Finally, the second laser emission apparatus 14, 14*b* can also be rotated about a third axis 34, 34*b* of the second positioning apparatus 22, 22*b* using a third positioning element 40, 40*b* of the second positioning apparatus 22, 22*b*. The first axis 30, 30*b*, the second axis 32, 32*b* and the third axis 34, 34*b* of the second positioning apparatus 22, 22*b* are likewise in each case perpendicular to one another and form a Cartesian coordinate system.

The first and second positioning elements 36, 36*a*, 36*b*, 38, 38*a*, 38*b* of both positioning apparatuses 22, 22*a*, 22*b* are in each case implemented as actuators in the form of actuable servo motors (not illustrated here in more detail). The rotation about the first axis 30, 30*a*, 30*b* and the second axis 32, 32*a*, 32*b* is enabled without limitation (i.e. multiple rotations are possible in principle). The third positioning elements 40, 40*a*, 40*b* of both positioning apparatuses 22, 22*a*, 22*b* are implemented in the form of one structural part. The third positioning element 40, 40*a*, 40*b* is here actuable manually, that is to say rotatable by hand, which means that a user of the laser leveling device 10 can manually rotate the base plate 12 including the components it carries. The rotation about the third axis 34, 34a, 34b is enabled without limitation (i.e. multiple rotations are possible in principle).

The third positioning element 40, 40a, 40b is provided to be arranged on a support, for example a table or a tripod or the like. The leveling device 10 has an apparatus 50 for checking the alignment of the laser leveling device 10 with respect to the direction of gravity 46a as the reference 46 outside the device in the form of a level. The level can be used by the user to arrange and align the laser leveling device 10 on the support (not illustrated here in more detail) in a manner such that the laser leveling device 10 and in particular the positioning apparatuses 22, 22a, 22b and thus also the first laser emission apparatus 14, 14a and the second laser emission apparatus 14, 14b have a defined alignment with respect to the direction of gravity 46a.

The laser leveling device 10 has a first sensor apparatus 24 for ascertaining an actual alignment of the first laser emission apparatus 14, 14a and an actual alignment of the second laser emission apparatus 14, 14b with respect to the projection surface 20. The first sensor apparatus 24 comprises a spatially resolving time-of-flight distance sensor 48 for capturing spatially resolved distance measurements, wherein the first sensor apparatus 24 is configured to ascertain the actual alignment of the first laser emission apparatus 14, 14a and the actual alignment of the second laser emission apparatus 14, 14b with respect to the projection surface 20 on the basis of the spatially resolved distance measurements. Here, the actual alignment of the base plate 12 (in particular the housing) carrying the time-of-flight distance sensor 48 with respect to the projection surface 20 is in fact determined. The actual alignment of the first laser emission apparatus 14, 14a and, respectively, the actual alignment of the second laser emission apparatus 14, 14b with respect to the projection surface 20 can then be calculated indirectly using the positions of the servo motors of the first positioning element 36, 36a and of the second positioning element 38, 38a of the first positioning apparatus 22, 22a and, respectively, the positions of the servo motors of the first positioning element 36, 36b and the second positioning element 38, 38b of the second positioning apparatus 22, 22b. The first sensor apparatus 24 (alternatively also the control apparatus of the laser leveling device 10) is configured for carrying out this calculation.

Since the laser leveling device 10 is already alignable with respect to the direction of gravity 46a on the part of a user by means of the level, no second sensor apparatus 44 for ascertaining an actual alignment or the first laser emission apparatus 14, 14a and an actual alignment of the second laser emission apparatus 14, 14b with respect to the direction of gravity 46a is necessary in this exemplary embodiment.

Furthermore, the laser leveling device 10 comprises a control apparatus 42. The control apparatus 42 serves for controlling, in particular operating, the laser leveling device 10. The control apparatus 42 has a processor, a memory, and at least one operating program with calculation routines and control routines. The control apparatus 42 is connected for the exchange of signals to the further components of the laser leveling device 10, here to the first sensor apparatus 24, the first positioning apparatus 22, 22a—in particular to the servo motors of the positioning elements 36, 36a, 38, 38a of the first positioning apparatus 22, 22a—, the second positioning apparatus 22, 22b—in particular to the servo motors of the positioning elements 36, 36b, 38, 38b of the second positioning apparatus 22, 22b—, and to the laser light source for controlling them. The control apparatus 42 is specifically configured to calculate a desired alignment of the first laser emission apparatus 14, 14a on the basis of the actual alignment of the first laser emission apparatus 14, 14a with respect to the projection surface 20, and to calculate a desired alignment of the second laser emission apparatus 14, 14b on the basis of the actual alignment of the second laser emission apparatus 14, 14b with respect to the projection surface 20. Furthermore, the control apparatus 42 is configured to control the servo motors of the first positioning apparatus 22, 22a—in particular the servo motors of the positioning elements 36, 36a, 38, 38a—and the servo motors of the second positioning apparatus 22, 22b—in particular the servo motors of the positioning elements 36, 36b, 38, 38b—in a manner such that the first laser emission apparatus 14, 14a and the second laser emission apparatus 14, 14b adopt their respective desired alignments.

It is possible with the exemplary embodiments of the laser leveling device 10 shown in FIG. 1 and FIG. 2 to be able to emit a plurality of laser markings 16 onto a projection surface 20. In both exemplary embodiments, the laser markings 16 are implemented in the form of one-dimensional laser lines 16a, 16b. The laser lines 16a, 16b are implemented in each case as a solid line in red.

Figures 3A, 3B:
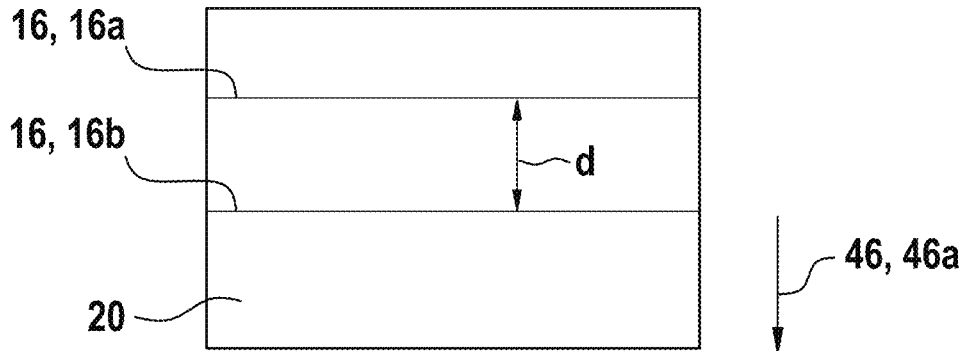
FIGS. 3*a* and 3*b* show a schematic view of a laser leveling device according to the disclosure in an exemplary application scenario.

FIGS. 3a and 3b show a first application scenario of the laser leveling device 10 according to the disclosure, as was introduced in FIG. 1 or 2 (illustrated here without the base plate 12). The first laser emission apparatus 14, 14a and the second laser emission apparatus 14, 14b are aligned by means of the first positioning apparatus 22, 22a and, respectively, the second positioning apparatus 22, 22b (FIG. 3b) such that two horizontal laser markings 16 in the form of two laser lines 16a, 16b appear on the projection surface 20 (FIG. 3a). The two laser markings 16 are here orthogonal to the reference 46 outside the device, that is to say to the direction of gravity 46a. The laser leveling device 10 illustrated in FIG. 1 or 2 can furthermore have an input apparatus (not illustrated here in more detail), which is here implemented in the form of a data communication interface for receiving information input by means of an external data device (for example a smartphone). For example, a distance d with which the two laser lines 16a, 16b appear on the projection surface 20 can be specifiable on the part of a user of the laser leveling device 10 by means of the input apparatus. The control apparatus 42 is furthermore configured to calculate the desired alignment of the first laser emission apparatus 14, 14a and the desired alignment of the second laser emission apparatus 14, 14b in a manner such that the laser lines 16a, 16b appear as parallel lines having the specified distance d on the projection surface 20.

Figure 4A:
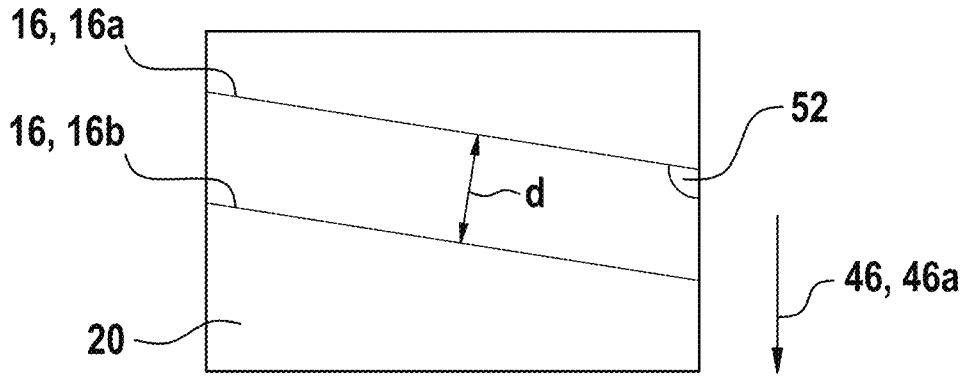
FIGS. 4*a* and 4*b* show a schematic view of a laser leveling device according to the disclosure in a second exemplary application scenario.
Figure 4B:
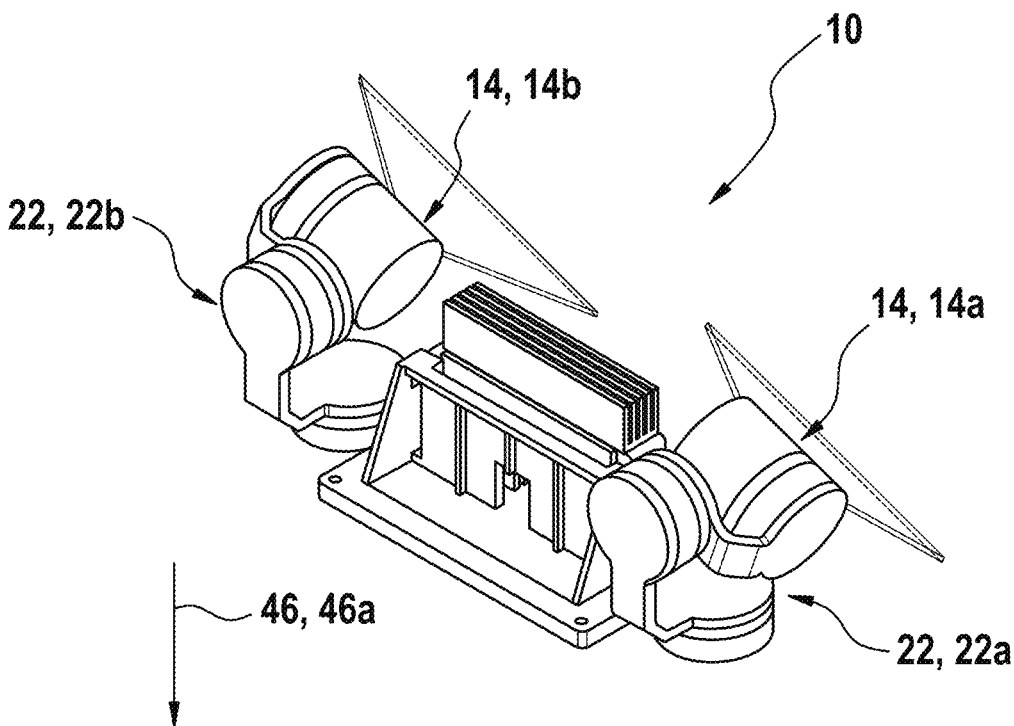

FIGS. 4a and 4b show a second application scenario of the laser leveling device 10 according to the disclosure, as was introduced in FIGS. 1 to 3 (illustrated here without the base plate 12). The first laser emission apparatus 14, 14a and the second laser emission apparatus 14, 14b are aligned by means of the first positioning apparatus 22, 22a and, respectively, the second positioning apparatus 22, 22b (FIG. 4b) in a manner such that two laser markings 16 running obliquely in the form of two laser lines 16a, 16b appear on the projection surface 20 (FIG. 4a). The two laser markings 16 here have a slope angle 52 to the reference 46 outside the device, that is to say to the direction of gravity 46a. The laser leveling device 10 illustrated in FIG. 1 or 2 can for this purpose also here have an input apparatus, for example in the form of operating elements (not illustrated here in more detail) for inputting the slope angle 52. Furthermore, the distance d with which the two laser lines 16a, 16b appear on the projection surface can be specifiable on the part of the user of the laser leveling device 10 by means of the input apparatus. The control apparatus 42 is configured to calculate the desired alignment of the first laser emission apparatus 14, 14a and the desired alignment of the second laser emission apparatus 14, 14b in a manner such that the laser lines 16a, 16b appear on the projection surface 20 as parallel lines with the specified distance d and at the slope angle 52 with respect to the direction of gravity 46a.

Figure 5A:
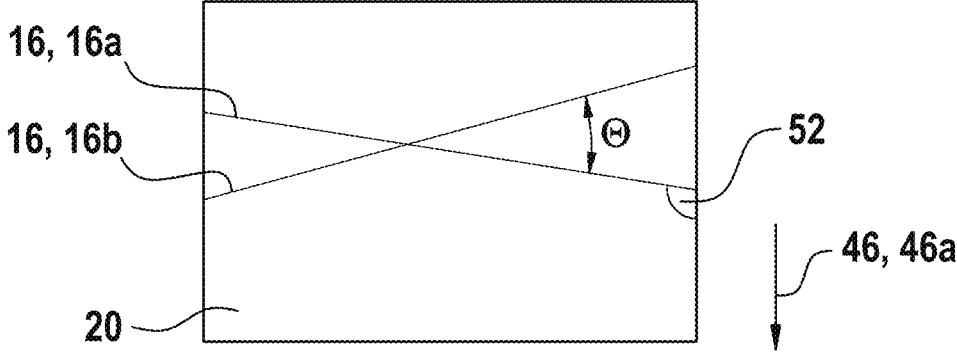
FIGS. 5*a* and 5*b* show a schematic view of a laser leveling device according to the disclosure in a third exemplary application scenario.
Figure 5B:
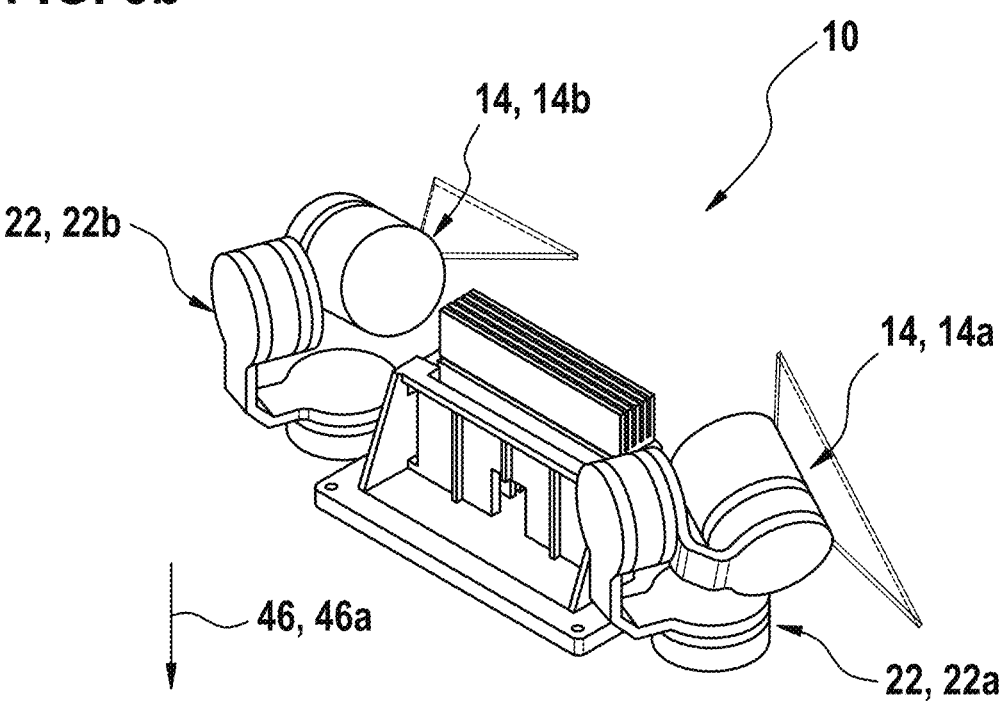

FIGS. 5a and 5b show a third application scenario of the laser leveling device 10 according to the disclosure, as was introduced in FIGS. 1 to 4 (illustrated here without the base plate 12). The first laser emission apparatus 14, 14a and the second laser emission apparatus 14, 14b are aligned by means of the first positioning apparatus 22, 22a and, respectively, the second positioning apparatus 22, 22b (FIG. 5b) such that two intersecting laser markings 16 running obliquely to one another appear on the projection surface 20 in the form of two laser lines 16a, 16b (FIG. 5a). A first of the two laser markings, laser line 16a, here has a specified slope angle 52 to the reference 46 outside the device, that is to say to the direction of gravity 46a. The second laser marking 16, laser line 16b, has a specified angle θ to the first laser line 16a. Both the slope angle 52 and the angle θ were input, and thus specified, on the part of a user by means of the input apparatus. The control apparatus 42 is configured to calculate the desired alignment of the first laser emission apparatus 14, 14a and the desired alignment of the second laser emission apparatus 14, 14b in a manner such that the laser lines 16a, 16b appear on the projection surface 20 at a corresponding intersecting angle θ and at the specified slope angle 52 with respect to the direction of gravity 46a

Figures 6A, 6B:
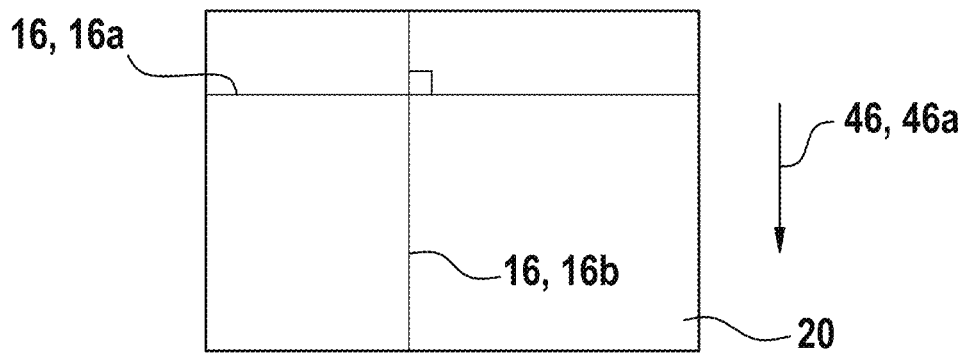
FIGS. 6*a* and 6*b* show a schematic view of a laser leveling device according to the disclosure in a fourth exemplary application scenario.

FIGS. 6a and 6b show a fourth application scenario of the laser leveling device 10 according to the disclosure, as was introduced in FIGS. 1 to 5 (illustrated here without the base plate 12). The first laser emission apparatus 14, 14a and the second laser emission apparatus 14, 14b are aligned here by means of the first positioning apparatus 22, 22a and, respectively, the second positioning apparatus 22, 22b (FIG. 6b) in a manner such that two laser markings 16 running orthogonally to one another appear on the projection surface 20 in the form of two laser lines 16a, 16b (FIG. 6a). A first of the two laser markings, laser line 16a, here runs orthogonally to the reference 46 outside the device, that is to say to the direction of gravity 46a. The second laser marking 16, laser line 16b, has an angle of 90° to the first laser line 16a and thus runs parallel to the reference 46 outside the device, that is to say to the direction of gravity 46a. Consequently, the laser lines 16a, 16b form a laser cross on the projection surface 20. The control apparatus 42 is configured to calculate the desired alignment of the first laser emission apparatus 14, 14a and the desired alignment of the second laser emission apparatus 14, 14b in a manner such that the laser lines 16a, 16b appear on the projection surface 20 at a corresponding right intersection angle and with the specified alignment with respect to the direction of gravity 46a.

Figure 7A:
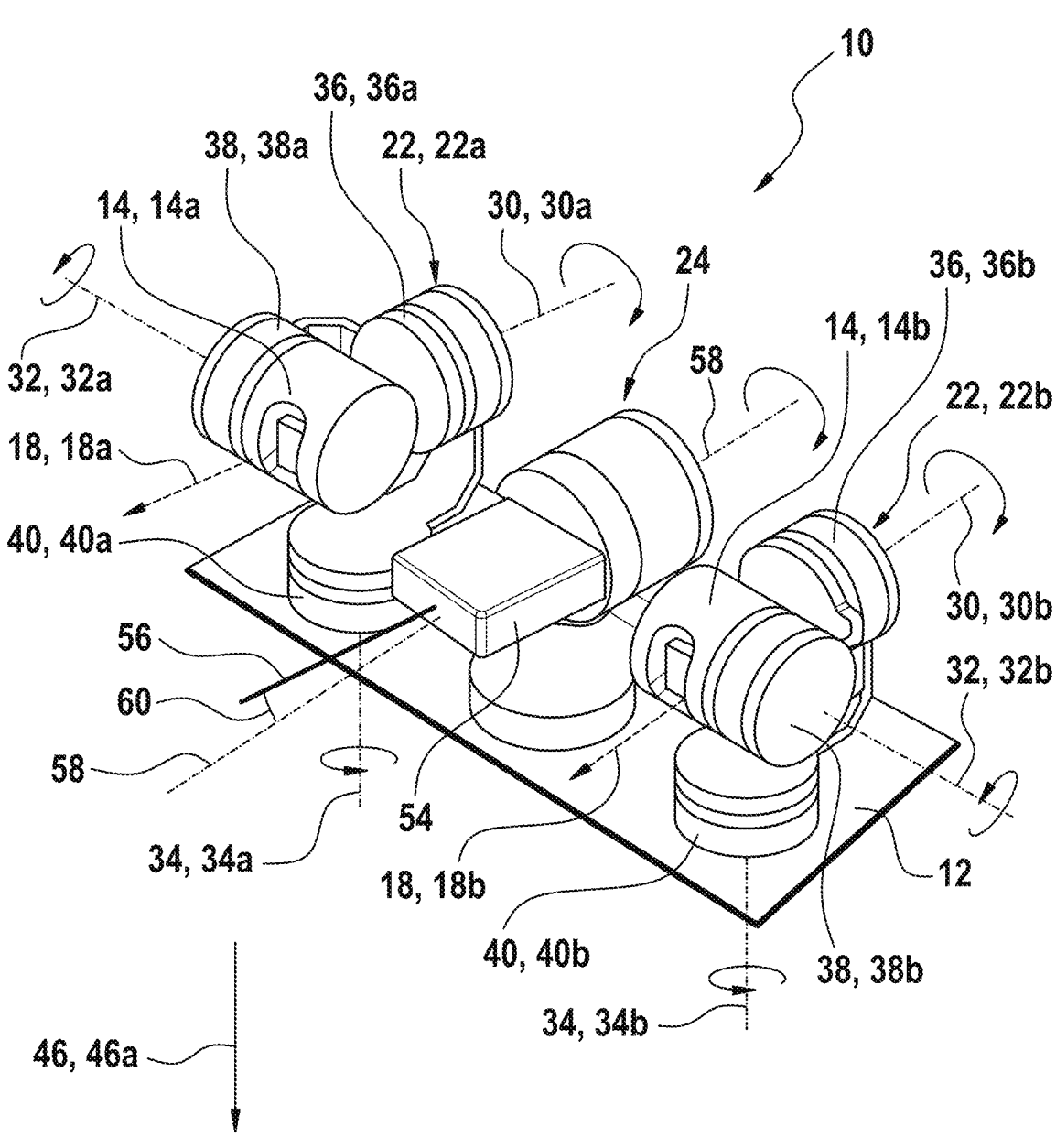
FIG. 7*a* shows a schematic view of an alternative exemplary embodiment of the laser leveling device according to the disclosure
Figure 7B:
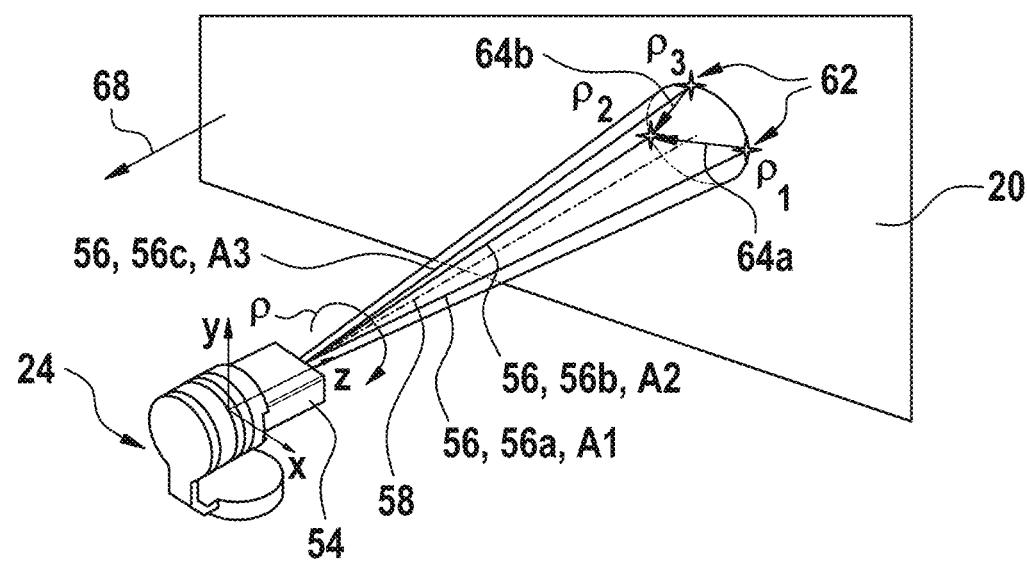

FIGS. 7a and 7b show a further exemplary embodiment, in which the laser leveling device 10 of FIG. 1 is modified. In the illustration in FIG. 7a, the control apparatus 42 and the second sensor apparatus 44 are not shown for the sake of clarity. In particular, compared to the exemplary embodiments in FIGS. 1 and 2, the laser leveling device 10 illustrated in FIG. 7a has a different first sensor apparatus 24 for ascertaining an actual alignment of the first laser emission apparatus 14, 14a and an actual alignment of the second laser emission apparatus 14, 14b with respect to the projection surface 20. The first sensor apparatus 24 comprises a distance sensor 54 for contactless distance measurement in a distance measurement direction 56. The distance sensor 54 is implemented in the form of a laser rangefinder, here a SPAD laser rangefinder. Laser rangefinders and in particular also SPAD laser rangefinders are known to a person skilled in the art. The distance sensor 54 is mounted rotatably with respect to a rotation axis 58. The distance measurement direction 56 forms an angle 60 (φ) of 20° to the rotation axis 58. In the case of a complete rotation of the distance sensor 54 about the rotation axis 58, a target point 62, with respect to which the distance sensor 54 ascertains on the projection surface 20 a distance, describes an ellipse. The first sensor apparatus 24 is configured to ascertain the actual alignment of the first laser emission apparatus 14, 14a and the actual alignment of the second laser emission apparatus 14, 14b with respect to the projection surface 20 on the basis of three distance measurements in different distance measurement directions 56a, 56b, 56c, that is so say with different relative arrangements of the distance sensor 54 to the rotation axis 58. As has already been stated above, the ascertainment of the actual alignment can also take place indirectly via calculation (see statements regarding the stereo camera). On the basis of the three distance measurements, a relative alignment of the first sensor apparatus 24 with respect to the projection surface 20 is determined by calculation. As is illustrated in FIG. 7b, two vectors 64a, 64b, which lie in the projection surface 20, can be determined from the three distance measurements A1, A2, A3 in the three distance measurement directions 56a, 56b, 56c including the associated rotation angles ρ1, ρ2, ρ3 of the distance measurement direction 56 about the rotation axis 58 (obtainable here by reading the rotation angle of the motor used for the rotation). Here, a respective vector 64a, 64b connects in each case two target points 62. The vector 64a is here defined between the target points 62 of the distance measurements A1, A2, while the vector 64b is defined between the target points 62 of the distance measurements A2, A3.

Figure 7C:
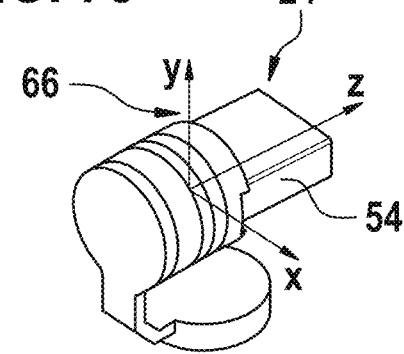
Figure 7D:
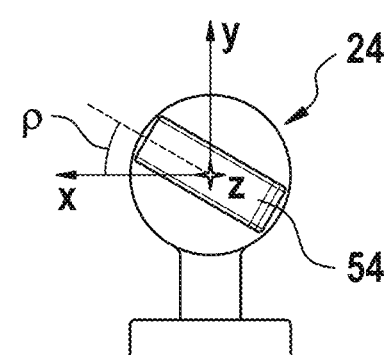
Figure 7E:
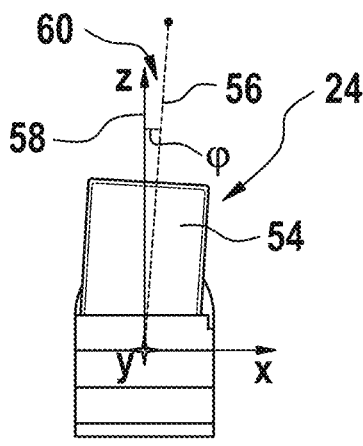

As is illustrated in FIGS. 7c, 7d and 7e, a Cartesian coordinate system 66 can then be introduced, in which the z-axis is collinear with the rotation axis 58, while the x-axis and the y-axis each run perpendicular to one another and perpendicular to the rotation axis 58. The x-axis at the same time defines, as is shown in FIG. 7d, the rotation angle ρ=0°. In this arrangement, the following equation system can be set up, which allows the statement of the vector coordinates with respect to the defined coordinate system 66. Here:

$$X = A_i \sin \varphi \cos \rho$$

$$Y = A_i \sin \varphi \sin \rho$$

$$Z = A_i \cos \varphi$$

With the two vectors 64a, 64b—with reference to the coordinate system 66—a normal vector 68 (see FIG. 7b) of the projection surface 20 can then be calculated by calculating the vector cross product. Using this normal vector 68, it is then possible to calculate the actual alignment—here of the introduced coordinate system 66 and thus the first sensor apparatus 24—to the projection surface 20.

It should be noted that a separate rotation apparatus (as illustrated in FIG. 7) can be provided for the rotation of the distance sensor 54. Alternatively, the rotation of the distance sensor 54 can also be effected by means of a positioning apparatus 22, for example the first positioning apparatus 22, 22a, in that the distance sensor, in addition to the first laser emission apparatus 14, 14a, is arranged movably and in particular rotatably at the first positioning apparatus 22, 22a.

Figure 8:
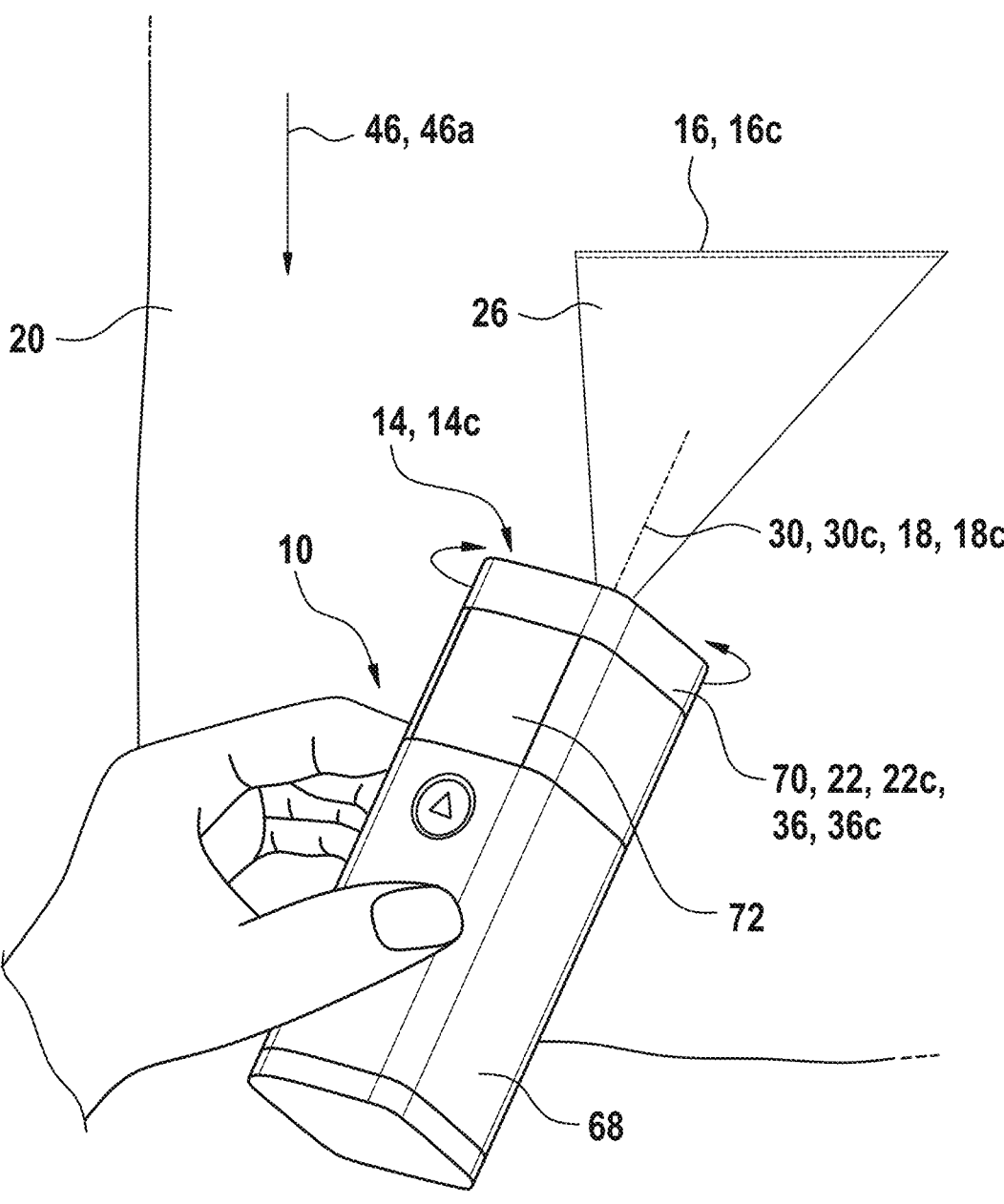
FIG. 8 shows a schematic view of an alternative exemplary embodiment of the laser leveling device according to the disclosure.

FIG. 8 shows a schematic view of a further exemplary embodiment of the laser leveling device 10 according to the disclosure. The laser leveling device 10 is here implemented in the form of a handheld laser leveling device 10. The laser leveling device 10 comprises a housing 68, which serves for receiving a laser emission apparatus 14, 14c for emitting a one-dimensional laser marking 16, here likewise a laser line 16c, in an emission direction 18 onto a projection surface 20. The housing 68 furthermore accommodates a laser light source for producing and emitting laser radiation (not illustrated in more detail here). The laser emission apparatus 14, 14c in this exemplary embodiment comprises a cylindrical lens as an optical unit for converting the laser radiation emitted by the laser light source into a laser plane 26 (the cylindrical lens is not illustrated here in more detail). The cylindrical lens is here arranged in a front housing part 70 of the housing 68. The front housing part 70 is mounted rotatably, and thus movably, with respect to the remaining housing part about a first axis 30, 30c. The front housing part 70 here represents a positioning apparatus 22, 22c, in which the cylindrical lens is mounted as a laser emission apparatus 14, 14c. The positioning apparatus 22, 22c serves for aligning the laser emission apparatus 14, 14c in accordance with a desired alignment. The front housing part 70 likewise represents a first (roll) positioning element 36, 36c of the positioning apparatus 22, 22c, which a user of the laser leveling device 10 can freely rotate manually by hand (see arrows). The first axis 30, 30c here extends collinearly to the emission direction 18, 18c of the first laser emission apparatus 14, 14c.

The laser leveling device 10 has a first sensor apparatus 24 for ascertaining an actual alignment of the laser emission apparatus 14, 14c with respect to the projection surface 20. The first sensor apparatus 24 comprises a spatially resolving time-of-flight distance sensor (here arranged on the side of the front housing part 70 facing the projection surface 20) for capturing spatially resolved distance measurements, wherein the first sensor apparatus 24 is configured to ascertain the actual alignment of the laser emission apparatus 14, 14c with respect to the projection surface 20 on the basis of the spatially resolved distance measurements. The actual alignment of the front housing part 70 (in particular of the housing) carrying the time-of-flight distance sensor 48 with respect to the projection surface 20 is in fact determined. Since the cylindrical lens as laser emission apparatus 14, 14c has a fixed construction-related reference to the first sensor apparatus 24, the actual alignment of the laser emission apparatus 14, 14c is consequently also ascertainable with respect to the projection surface 20.

The laser leveling device 10 has a second sensor apparatus 44 for ascertaining an actual alignment of the laser emission apparatus 14, 14c with respect to the direction of gravity 46a as the reference 46 outside the device (not illustrated in more detail here). For this purpose, the second sensor apparatus 44 comprises an inclination sensor, here in the form of an acceleration sensor and an angular rate sensor. In this case, the actual alignment of the front housing part 70 accommodating the second sensor apparatus 44 with respect to the reference 46 outside the device is determined. Consequently, the actual alignment of the laser emission apparatus 14, 14c with respect to the reference 46 outside the device is therefore also determined. A control apparatus 42 (not illustrated in more detail here) arranged in the housing 68 calculates a desired alignment of the laser emission apparatus 14, 14c, in particular the positioning apparatus 22, 22c—for example for the case of a horizontally aligned laser marking 16—by using the actual alignment of the laser emission apparatus 14, 14c with respect to the projection surface 20 and the actual alignment of the laser emission apparatus 14, 14c with respect to the reference 46 outside the device. The control apparatus 42 serves for controlling, in particular operating, the laser leveling device 10. The control apparatus 42 has a processor, a memory, and at least one operating program with calculation routines and control routines. The control apparatus 42 is connected for exchanging signals to the further components of the laser leveling device 10, here to the first sensor apparatus 24, the second sensor apparatus 44, and to the laser light source. The control apparatus 42 is specifically configured to calculate a desired alignment of the laser emission apparatus 14, 14c on the basis of the actual alignment of the first laser emission apparatus 14, 14c with respect to the projection surface 20 and with respect to the reference 46 outside the device.

By using an output apparatus 72, here in the form of a screen assigned to the housing 70, information relating to an actuation of the positioning element 36, 36c to be performed—to achieve the desired alignment can then be output to the user. By using the output information, it is possible for the user to actuate the positioning element 36, 36c by rotation in a manner such that the desired alignment is obtained, with which the laser marking 16 appears horizontal on the projection surface 20. The control apparatus 42 is furthermore configured to control in a targeted manner the output apparatus 72 to output corresponding information such as for example "rotate optical unit to the right by 10°." The laser leveling device 10 has, on its rear side (not illustrated in more detail here), a connector for a tripod socket.

Figure 9:
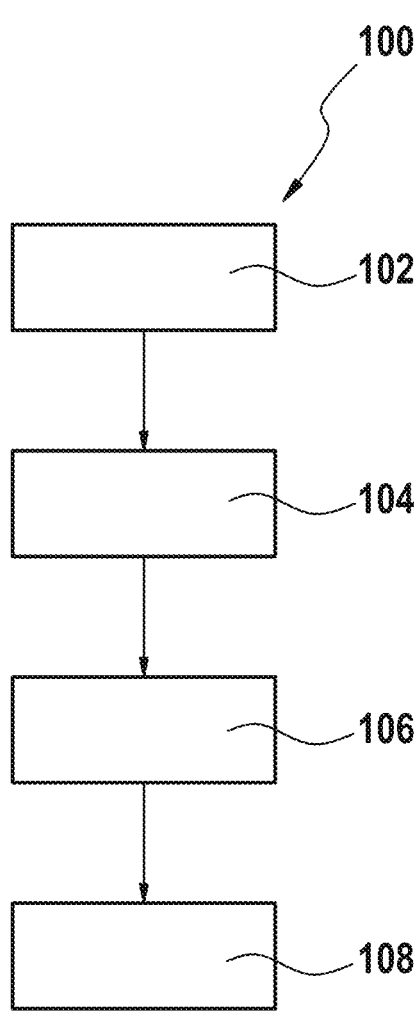
FIG. 9 shows a flowchart of an exemplary embodiment of the method according to the disclosure.

Finally, in FIG. 9, an exemplary embodiment of the method 100 according to the disclosure for leveling using a laser leveling device 10 according to the disclosure is illustrated. The following embodiment refers by way of example to the laser leveling device 10, as is illustrated in FIG. 1.

In a first method step 102, a user of the laser leveling device 10 aligns the at least two laser emission apparatuses 14, 14a, 14b toward the projection surface 20. For this purpose, the user pre-positions the laser leveling device 10 initially roughly. By using the third positioning element 40, 40a, 40b and the second positioning element 38, 38a, 38b and/or by rotating the laser leveling device 10, a more accurate alignment of the first laser emission apparatuses 14, 14a and of the second laser emission apparatuses 14, 14b in a direction of the projection surface 20 can take place.

In a second method step 104, the first sensor apparatus 24 of the laser leveling device 10 ascertains an actual alignment of the first laser emission apparatus 14, 14a with respect to the projection surface 20 and an actual alignment of the second laser emission apparatus 14, 14b with respect to the projection surface 20. This is done, for example, using the stereo camera 28, as was described in FIG. 1. Furthermore, an actual alignment of the first laser emission apparatus 14, 14a with respect to a reference 46 outside the device and an actual alignment of the second laser emission apparatus 14, 14b with respect to the reference 46 outside the device is ascertained in this method step 104 using the second sensor apparatus 44.

In a third method step 106, a desired alignment of the first laser emission apparatus 14, 14a is calculated by the control apparatus 42 on the basis of the ascertained actual alignment of the first laser emission apparatus 14, 14a with respect to the projection surface 20 and on the basis of the ascertained actual alignment of the first laser emission apparatus 14, 14a with respect to the reference 46 outside the device. Furthermore, a desired alignment of the second laser emission apparatus 14, 14b is calculated by the control apparatus 42 on the basis of the ascertained actual alignment of the second laser emission apparatus 14, 14b with respect to the projection surface 20 and on the basis of the ascertained actual alignment of the second laser emission apparatus 14, 14b with respect to the reference 46 outside the device.

In method step 108, the first laser emission apparatus 14, 14a is aligned in accordance with the desired alignment of the first laser emission apparatus 14, 14a by rotating the first laser emission apparatus 14, 14a about the first axis 30, 30a, the second axis 32, 32a and/or the third axis 34, 34a using the positioning apparatus 22, 22a, in particular using the first positioning element 36, 36a, the second positioning element 38, 38a and, respectively, the third positioning element 40, 40a of the first positioning apparatus 22, 22b. At the same time, the second laser emission apparatus 14, 14b is aligned in accordance with the desired alignment of the second laser emission apparatus 14, 14b by rotating the second laser emission apparatus 14, 14b about the first axis 30, 30b, the second axis 32, 32b and/or the third axis 34, 34b using the second positioning apparatus 22, 22b, in particular using the first positioning element 36, 36b, the second positioning element 38, 38b and, respectively, the third positioning element 40, 40b of the second positioning apparatus 22, 22b.

The invention claimed is:

1. A laser leveling device, comprising
at least one laser emission apparatus configured to emit a laser marking in an emission direction onto a projection surface;
a first sensor apparatus configured to ascertain a first actual alignment of the at least one laser emission apparatus with respect to the projection surface;
a control apparatus configured to calculate a desired alignment of the at least one laser emission apparatus on the basis of at least the first actual alignment of the at least one laser emission apparatus with respect to the projection surface; and
a positioning apparatus configured to align the at least one laser emission apparatus in accordance with the desired alignment.

2. The laser leveling device as claimed in claim 1, further comprising:
a second sensor apparatus configured to ascertain a second actual alignment of the at least one laser emission apparatus with respect to at least one reference outside the device,
wherein the control apparatus is configured to calculate the desired alignment of the at least one laser emission apparatus on the basis of the second actual alignment of the at least one laser emission apparatus with respect to the reference outside the device and the first actual alignment of the at least one laser emission apparatus with respect to the projection surface.

3. The laser leveling device as claimed in claim 1, wherein the at least one laser emission apparatus is rotatable at least about a first axis, which runs parallel or collinearly to the emission direction, using the positioning apparatus.

4. The laser leveling device as claimed in claim 3, wherein:
the at least one laser emission apparatus is rotatable at least about a second axis using the positioning apparatus, and
the first axis and the second axis are substantially orthogonal to one another.

5. The laser leveling device as claimed in claim 4, wherein:

the at least one laser emission apparatus is rotatable at least about a third axis using the positioning apparatus, and
the second axis and the third axis are substantially orthogonal to one another.

6. The laser leveling device as claimed in claim 5, wherein the positioning apparatus has a first positioning element configured to rotate the at least one laser emission apparatus about the first axis and/or a second positioning element configured to rotate the at least one laser emission apparatus about the second axis and/or a third positioning element configured to rotate the at least one laser emission apparatus about the third axis.

7. The laser leveling device as claimed in claim 6, wherein at least one of the first, second, and third positioning elements comprises an electromechanical actuator, and/or at least one of the first, second, and third positioning elements is manually actuatable.

8. The laser leveling device as claimed in claim 6, further comprising:
an output apparatus configured to output information to a user relating to an actuation of the first positioning element and/or of the second positioning element and/or of the third positioning element which is to be performed to achieve the desired alignment of the at least one laser emission apparatus.

9. The laser leveling device as claimed in claim 1, further comprising:
an input apparatus configured to receive a slope angle of the laser marking on the projection surface as specified by a user,
wherein the control apparatus is configured to calculate the desired alignment of the at least one laser emission apparatus in a manner such that the laser marking is emitted at the specified slope angle.

10. The laser leveling device as claimed in claim 1, further comprising:
at least one second laser emission apparatus configured to emit a second laser marking in a second emission direction onto the projection surface, wherein:
1 the first sensor apparatus is configured to ascertain a second actual alignment of the at least one second laser emission apparatus with respect to the projection surface and/or (ii) at least one additional first sensor apparatus is configured to ascertain the second actual alignment of the at least one second laser emission apparatus with respect to the projection surface, and
the control apparatus is further configured to calculate a second desired alignment of the at least one second laser emission apparatus on the basis of the second actual alignment of the at least one second laser emission apparatus with respect to the projection surface; and
a second positioning apparatus configured to align the at least one second laser emission apparatus in accordance with the second desired alignment.

11. The laser leveling device as claimed in claim 1, wherein the at least one laser emission apparatus is configured to emit the laser marking as a one-dimensional laser marking.

12. A method for leveling using a laser leveling device, the method comprising:
arranging at least one laser emission apparatus of the laser leveling device to emit a laser marking in an emission direction toward a projection surface;

ascertaining a first actual alignment of the at least one laser emission apparatus with respect to the projection surface using at least one first sensor apparatus of the laser leveling device;

calculating a desired alignment of the at least one laser emission apparatus on the basis of the first actual alignment of the at least one laser emission apparatus with respect to the projection surface using a control apparatus of the laser leveling device; and aligning the at least one laser emission apparatus in accordance with the desired alignment using a positioning apparatus of the laser leveling device.

13. The method as claimed in claim 12, further comprising:

ascertaining a second actual alignment of the at least one laser emission apparatus with respect to at least one reference outside the device using at least one second sensor apparatus of the laser leveling device, wherein the calculating of the desired alignment of the at least one laser emission apparatus includes calculating of the desired alignment using the control apparatus on the basis of the first actual alignment of the at least one laser emission apparatus with respect to the projection surface and on the basis of the second actual alignment of the at least one laser emission apparatus with respect to the reference outside the device.

14. The method as claimed in claim 12, wherein the aligning of the at least one laser emission apparatus toward the projection surface includes rotating the at least one laser emission apparatus about a first axis and/or about a second axis and/or about a third axis.

15. The method as claimed in claim 12, further comprising:

outputting information relating to an alignment of the at least one laser emission apparatus that is to be carried out to achieve the desired alignment to a user of the laser leveling device with an output apparatus of the laser leveling device.

16. The method as claimed in claim 12, further comprising:

prior to ascertaining the first actual alignment, receiving an intended slope angle of the laser marking on the projection surface as specified by a user of the laser leveling device via an input apparatus of the laser leveling device, wherein the calculating of the desired alignment of the at least one laser emission apparatus includes calculating the desired alignment in a manner such that the laser marking is emitted at the specified slope angle.

\*   \*   \*   \*   \*